United States Patent
Vaughn et al.

(10) Patent No.: US 7,004,669 B1
(45) Date of Patent: Feb. 28, 2006

(54) INTERNAL V-BAND CLAMP

(75) Inventors: Mark R. Vaughn, Albuquerque, NM (US); Everett S. Hafenrichter, Albuquerque, NM (US); Agapito C. Chapa, Albuquerque, NM (US); Steven M. Harris, Albuquerque, NM (US); Marcus J. Martinez, Albuquerque, NM (US); Roy S. Baty, Los Alamos, NM (US)

(73) Assignee: Sandia Corporation, Albuquerque, NM (US)

( * ) Notice: Subject to any disclaimer, the term of this patent is extended or adjusted under 35 U.S.C. 154(b) by 163 days.

(21) Appl. No.: 10/700,839

(22) Filed: Nov. 3, 2003

(51) Int. Cl.
*F16B 7/00* (2006.01)

(52) U.S. Cl. .................. 403/297; 403/291; 403/292

(58) Field of Classification Search ............... 403/309, 403/313, DIG. 7, 355, 356, 362, 373, 235, 403/236, 286, 288, 291, 292, 297, 298; 285/370, 285/397, 406, 420
See application file for complete search history.

(56) References Cited

U.S. PATENT DOCUMENTS

| | | | | |
|---|---|---|---|---|
| 831,551 | A * | 9/1906 | Guttzeit | 285/330 |
| 2,650,115 | A * | 8/1953 | Taylor | 285/105 |
| 2,790,409 | A * | 4/1957 | Cain | 114/22 |
| 3,122,383 | A * | 2/1964 | Hirsch | 285/397 |
| 3,401,436 | A | 9/1968 | Bradshaw et al. | |
| 3,960,395 | A * | 6/1976 | Cirule et al. | 285/370 |
| 3,974,835 | A * | 8/1976 | Hardy, Jr. | 285/370 |
| 4,013,373 | A * | 3/1977 | Lamprecht et al. | 403/291 |
| 4,927,189 | A * | 5/1990 | Burkit | 285/109 |
| 5,029,907 | A * | 7/1991 | Gundy | 285/230 |
| 5,092,633 | A * | 3/1992 | Burkit | 285/109 |
| 5,201,550 | A * | 4/1993 | Burkit | 285/109 |
| 5,464,147 | A | 11/1995 | Minami | |
| 6,149,206 | A | 11/2000 | DiRocco | |
| 6,269,748 | B1 | 8/2001 | Rudoy et al. | |
| 6,634,825 | B1 * | 10/2003 | Tolkoff et al. | 403/286 |

OTHER PUBLICATIONS

ISO 9001 Certified Company, Jupiter V-Band Coupling Clamps, http://www.jupiter-clamps.com/inside_mainfr1_vb.htm, 1 page.

* cited by examiner

*Primary Examiner*—William L. Miller
*Assistant Examiner*—Ruth C. Rodriguez
(74) *Attorney, Agent, or Firm*—George H. Libman; William R. Conley

(57) ABSTRACT

A system for clamping two tubular members together in an end-to-end relationship uses a split ring with a V-shaped outer rim that can engage a clamping surface on each member. The split ring has a relaxed closed state where the ends of the ring are adjacent and the outside diameter of the split ring is less than the minimum inside diameter of the members at their ends. The members are clamped when the split ring is spread into an elastically stretched position where the ring rim is pressed tightly against the interior surfaces of the members. Mechanisms are provided for removing the spreader so the split ring will return to the relaxed state, releasing the clamped members.

15 Claims, 3 Drawing Sheets

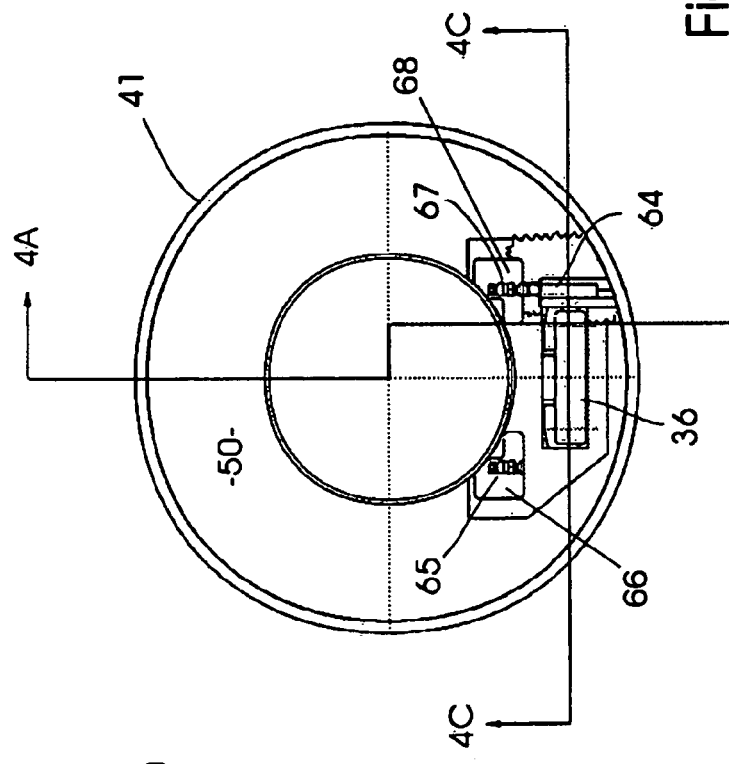
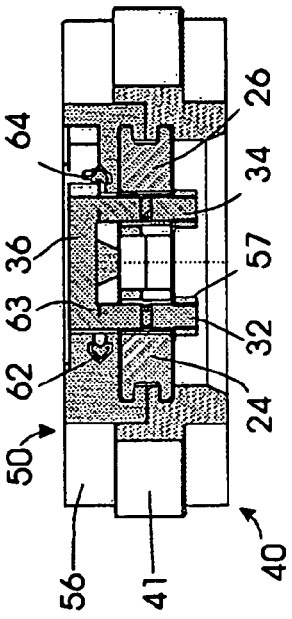
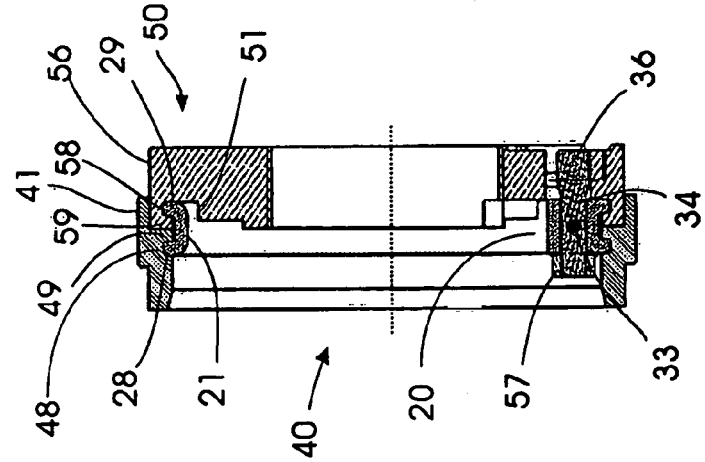

INTERNAL V-BAND CLAMP

The United States Government has rights in this invention pursuant to Department of Energy Contract No. DE-AC04-94AL85000 with Sandia Corporation.

CROSS REFERENCE TO RELATED APPLICATIONS (Not Applicable)

BACKGROUND OF THE INVENTION

Spring clips and snap rings are well known examples of a family of mechanical devices made of an elongated material such as metal or plastic that is formed into a loop that is inelastic along the length of the loop and elastic when force is applied transverse to the loop. U.S. Pat. No. 6,149,206 of J. DiRocco shows two types of such devices: FIG. 1 shows an external clip with spaced members that spread apart while being applied and then spring back to a resting position within slots on the exterior of a cylinder. FIG. 3 shows an internal clip with spaced members that compress while being applied and then spring back to a resting position within a slot on the interior of a cylinder. External force is applied to each of these clips while they are transitioning from the applied state within a slot to being disconnected from the slot. The clips are not under tension when in normal use.

The particular application for which this invention is designed is to clamp two tubes together at their ends. One typical way of accomplishing this task is with a V-band, or Marman, clamp that encircles abutting exterior flanges on each tube with a V-shaped member on the interior surface of the clamp. A tensioning device holds the clamp tightly against the flanges. The exterior V-band clamp cannot be used in underground and similar environments where the exterior surface of the tubes is tightly surrounded by earth or other medium.

U.S. Pat. No. 6,269,748 of E. Rudoy et al discloses a triggering mechanism for a V-band clamp that enables a small force to release the clamp.

U.S. Pat. No. 5,464,147 of N. Miknami discloses an internal clamp for aligning two large cylinders together for welding by expanding a ring with compressed air against the inside edge of two abutting cylinders. Coil springs retract the clamp after the air is released.

SUMMARY OF THE INVENTION

It is an object of this invention to provide an interior mounted ring clamp having a V-band extending around its exterior surface that is expanded against grooves or flanges on the interior wall of a pair of adjoining cylinders and which springs to a reduced diameter when tension is released.

To achieve the foregoing and other objects, and in accordance with the purpose of the present invention, as embodied and broadly described herein, the invention is a method for controllably clamping an end of one hollow member to an end of a second hollow member including the steps of placing at the joint between the members a split ring having a closed state where the ends of the ring are adjacent and the outside diameter of the split ring is less than the minimum inside diameter of the members at the joint, the split ring having a V-shaped rim with two spaced projecting surfaces; and separating the ends of the split ring until the rim engages the inside of both hollow members with one spaced projecting surface in contact with the clamping surface of one member and the other spaced projecting surface in contact with the clamping surface of the other member. If the ends of the split ring are allowed to move together, the members are no longer clamped together.

The invention also is an internal V-clamp for holding two abutting hollow members in an end-to-end relationship, each member having a clamping surface extending from an interior surface adjacent the abutted end, the clamp including a split ring having a relaxed closed state where the ends of the ring are adjacent and the outside diameter of the split ring is less than the minimum inside diameter of the members at their ends, the split ring having a V-shaped rim with two spaced projecting surfaces; and a spreader for holding the split ring in an elastically stretched position such that the ring rim is pressed tightly against the interior surfaces of the members with one projecting surface being in contact with the clamping surface of one member and the other projecting surface being in contact with the clamping surface of the other member. Means are provided for removing the spreader so the split ring will return to the relaxed state, releasing the clamped members.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

FIGS. 4A, 4B, and 4C show sectional views of the clamped embodiment of FIG. 3.

DETAILED DESCRIPTION OF THE INVENTION

Figure 1A:
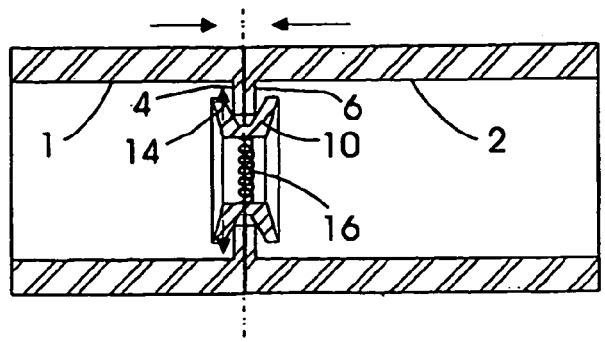
FIGS. 1A and 1B show expanded and contracted views of an internal V-band clamp.

FIG. 1A shows a pair of abutting members such as cylinders 1, 2 with opposed clamping surfaces 4, 6 extending from the interior surface of cylinders 1, 2 as end flanges that are fastened together by an internal V-band clamp 10 that has a V-shaped outer rim 12. The outside dimensions of cylinders 1, 2 are shown as substantially identical near the junction indicated by centerline 8, but since these dimensions do not affect the operation of the invention, cylinders 1, 2 may have outside dimensions quite different from one another. However, the inside dimensions of cylinders 1, 2 must be substantially identical, as discussed hereinafter.

Figure 1B:
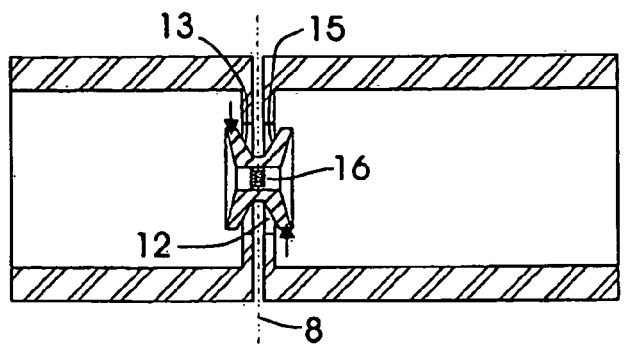
Figure 1C:
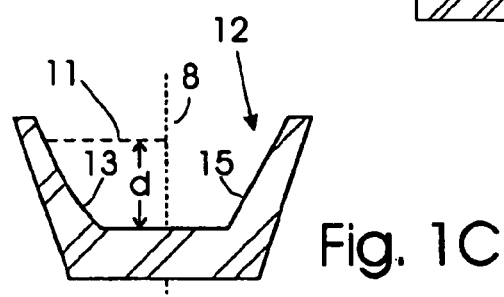
FIG. 1C shows a detail view of a portion of FIG. 1A

As shown in FIG. 1C and used herein, "V-shaped" includes any cross-section of a rim 12 having the common property of a pair of spaced projecting surfaces 13, 15 which each extend from clamp 10 such that the distance along a line 11 extending perpendicular from centerline 8 to each surface must not decrease as the distance d from line 11 to clamp 10 increases. Preferably, the distance along line 11 increases for the portions where surfaces 13, 15 contact cylinders 1, 2, as such construction facilitates the release of clamp 10 from cylinders 1, 2 when pressure is released. As illustrated, surface 15 has a linear profile while surface 13 has a curved profile. While prototype clamps will typically have symmetrical opposed surfaces, the actual design of any surface may be completed using well-known properties and teachings relating to the shape of contacting surfaces of external V-band clamps.

As shown in FIGS. 1A and 1B, a force 14 biases rim 12 against the two opposed surfaces, overcoming the tension of a spring 16. As discussed hereinafter, as the rim 12 moves toward the surfaces, the horizontal forces applied by the each opposed surface of rim 12 against the flanges causes cylinders 1, 2 to move tightly together. The outer surfaces of connected cylinders 1, 2 may form a continuous structure with no protuberances such as would be present if a conventional external V-band clamp were utilized. This structure has inherent advantages in applications where the cylinders are propelled through the air or where they must traverse a pipe.

FIG. 1B shows the same elements after the force 14 has been removed. Spring 16 retracts the V-band clamp 10 such that the outer diameter of rim 12 is now less than the diameter of cylinders 1,2 at the end of flanges 4,6. With the clamp no longer holding the cylinders together, they will separate under minimal external force.

Figure 2A:
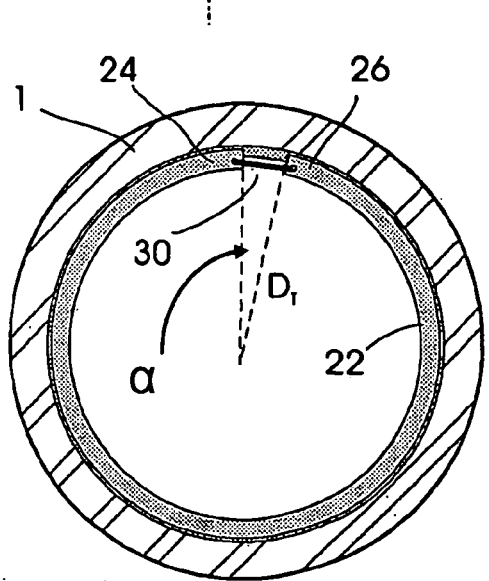
FIGS. 2A and 2B illustrate the principle of operation of the internal V-band clamp.

FIG. 2A shows internal V-band clamp 10 in accordance with the teachings of this invention tightly fitted in a spread position against the interior surface of tube 1. Clamp 10 consists of a split ring 22 and a spreader 30. Split ring 22 extends continuously from one end 24 to an opposite end 26, and each end 24, 26 may be enlarged towards the interior of tube 1 to provide a structure for a tool to manipulate split ring 22 for insertion or removal. Spreader 30 attaches to ends 24, 26 and holds split ring 22 in the expanded position shown in FIG. 2A. When split ring 22 is in the spread position illustrated in FIG. 2A, the entire circumference of the interior of tube 1 may be contacted by the rim of split ring 22 except for the portion over an angle α that is held open by spreader 30.

Figure 2B:
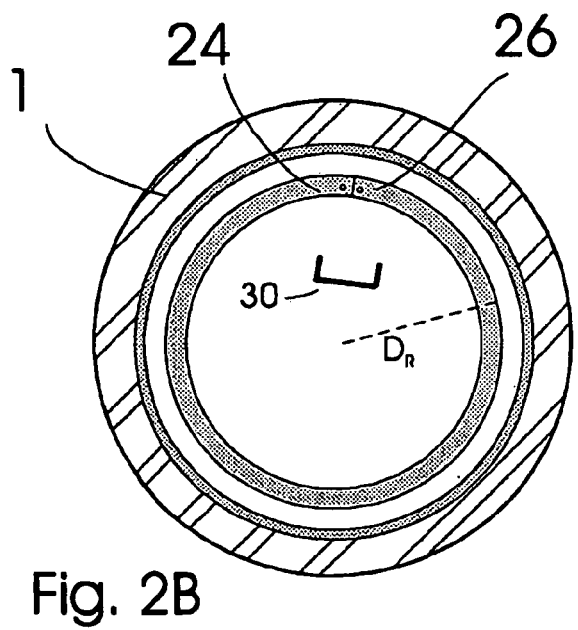

FIG. 2B shows split ring 22 after spreader 30 has been removed from ends 24, 26. The natural elasticity of split ring 22 causes it to return to its relaxed state with ends 24, 26 nearly touching. Since split ring 22 is not elastic along its length, and if one assumes both the relaxed split ring of FIG. 2B and the spread split ring of FIG. 2A are circular, the diameter of the relaxed split ring may be approximated as: $D_R=(1-\alpha/360)D_T$, where $D_R$ is the diameter of relaxed split ring 22 and $D_T$ is the inside diameter of tube 1.

The tubes for which this invention was originally designed have an inside diameter on the order of 30.5 cm (one foot) and an internal flange height on the order of 6.5 mm (0.25 inch). The internal diameter of the tube at the flange is on the order of 29.2 cm (11.5 inches). If it is desired that $D_R=28$ cm to ensure that ring 22 will not catch either tube as it releases, then α=24°.

Because of the relatively limited motion by ring 22, it should be clear that having the inside dimensions of cylinders 1, 2 substantially identical means they are sufficiently similar that clamp 10 in the stretched position will engage both cylinders.

Figure 3:
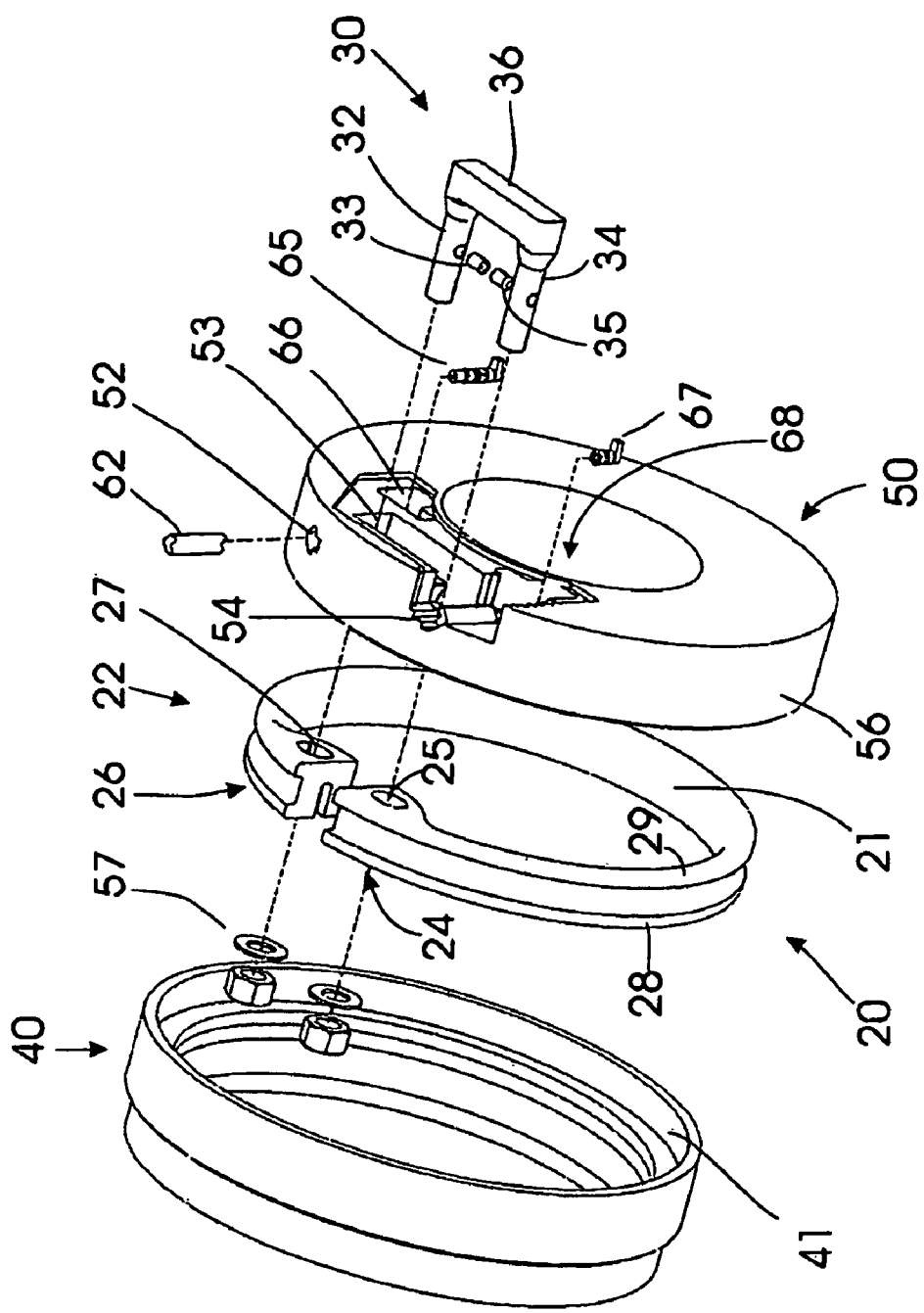
FIG. 3 shows an exploded view of a preferred embodiment of the invention.

FIG. 3 shows an exploded view of an embodiment of the invention to include a split ring 20, a cylindrical collar 40, and a cylindrical cover 50. Split ring 20 includes a V-shaped outer surface 22 and spaced ends 24, 26, each end having a hole 25, 27 which preferably, but not necessarily, extends through the leg. Spreader 30 is a rigid U-shaped structure with a pair of spaced legs 32, 34 extending parallel to each other from a connecting support member 36. Each of legs 32, 34 preferably has a through hole for an adjustable set screw 33, 35 as discussed hereinafter. A pair of linear shaped charges 62, 64 extend through holes 52, 54 from the rim 56 of cover 50. Actuators 65, 67 fit into openings 66, 68 in cover 50 as discussed hereinafter.

To use the invention, collar 40 is placed in contact with cover 50. Split ring 20, in its relaxed condition with end 24 adjacent and nearly touching end 26, is placed at the intersection of the cylinders. An external ring-opener, such as a wedge, hydraulic actuator, or other means (not shown), is used to open split ring 20 to the expanded position shown in FIG. 3, with outer surface 22 contacting the inner surface of collar 40 and cover 50 as discussed below. Spreader 30 is placed through an opening 53 in cover 50 with leg 32 extending through hole 27 and leg 34 extending through hole 25 of split ring 20. Conventional nut and washers 57 may be used to hold each leg of spreader 30 in place. Set screws 33, 35 in each leg 32, 34 can be tightened against ring 20 to ensure it is spread tightly against collar 40 and cover 50. The external ring-opener is removed after the spreader is in position.

FIGS. 4A, 4B, and 4C shows sectional views of the structure of FIG. 3 with the split ring 20 in an expanded position holding collar 40 and cover 50. The upper portion of FIG. 4A shows the structure at a location along slip ring 20; the lower portion of the figure shows the structure where a plane cuts through the length of spreader leg 34. FIG. 4C shows the structure where a plane cuts through spreader 30.

As shown in FIG. 4A, collar 40 includes an axially-extending flange 41 that extends over the rim 56 of cover 50 and functions to hold these pieces in position during the installation of ring 20. This view also shows that rim 22 of ring 20 has opposed raised portions 28, 29 which fit, respectively, in slots 48, 58 in collar 40 and cover 50. Each slot 48, 58 has an inwardly extending clamping face 49, 59 that engages an interior surface of one of raised portions 28, 29 to provide the clamping action similar to that taught in FIG. 1A. Cover 50 also may have a shoulder 51 that is parallel to and spaced from an inner surface 21 of ring 20. This shoulder 51 keeps ring 20 centered within cover 50, after spreader 30 is removed, which minimizes the chance that ring 20 could twist and jam in place.

Raised portions 28, 29 extend over the entire rim 22 of split ring 20, and therefore engage members 40, 50 over most of the circumference of the joint, as previously discussed. Alternatively, raised portions 28, 29 could be discontinuous and be spaced over several portions of rim 22. Such a construction would have less strength than the continuous embodiment disclosed in FIGS. 3 and 4, but it would also offer less friction when disengagement is desired.

In the preferred embodiment disclosed herein, a controllable leg-cutter is provided adjacent each leg. Linear shaped charges form one embodiment of leg-cutter for use in this invention.

Linear shaped charges of a type conventionally used to separate spacecraft stages are typically formed of a V-shaped explosive within a metal sheath. The V-shape focuses the detonation energy towards an item to be cut. The metal sheath forms a high-velocity, high-pressure plasma jet that cuts through the target by pushing it to either side of the jet's path. It is important for the charge to be spaced from the item to be cut by a sufficient amount to allow the plasma jet to form before it reaches the item's surface.

Linear shaped charges 62, 64 can be a metal liner filled with explosive. As well known in the art, these charges can be optimized by choosing specific liner materials (aluminum, copper, lead, etc.) or specific explosives (HMX, RDX, Octol, HNS, etc.). In one test of the invention, the particular linear shaped charge was 300 grains/foot LSC with HMX explosive and a copper sheath.

As shown in FIGS. 3, 4B, and 4C, each charge is placed in a hole 52, 54 adjacent and facing a leg 32, 34 between ring end 24, 26 and the place where the leg connects to support 36. To ensure that a relatively small shaped charge can sever the leg, a very thin slit 63 can be cut halfway through the leg on the side opposite the impact of the leg-cutter. During use, this slit is held closed by the forces imparted by ring 20 on legs 32, 34.

When the charges 62, 64 are detonated by their respective actuator 65, 67, the copper cladding forms a copper projectile that severs the adjoining leg from support 36, thereby causing split ring 20 to spring to the relaxed position of FIG. 2B. Other forces will then cause cover 50 to separate from collar 40, as the raised portions 28, 29 of rim 22 no longer are engaged with the slots 48, 58.

The relationship among each spreader leg and its associated shaped charge and actuator is shown in FIGS. 4B and 4C. Cover 50 is designed with openings to hold the shaped charges and actuators in the illustrated positions. If cover 50 were replaced with a much longer cylinder, the support structure for the linear shaped charges and actuators could easily be mounted directly to support 36 of spreader 30, or to the inside of the cylinder.

It should be apparent to those of ordinary skill in the art that this invention may be constructed of many materials depending on the desired physical properties of the resulting structure. One technique for constructing ring 22 is to cut it in the relaxed configuration of FIG. 2B from a sheet of material. The material should be a metal, plastic, or other material with sufficient elasticity to transverse forces to cause it to be forced into the spread position of FIG. 2A. So long as split ring 22 is not stressed beyond yield strength, it will return to the relaxed state when the spreader is removed.

The amount of stored force that clamp 10 has in the spread position must be great enough to overcome the friction between the touching surfaces of clamp 10 and cylinders 1 and 2. Friction is obviously maximized if surface 15 and its counterpart on a cylinder are parallel to axis 8, as this configuration maintains the surfaces in contact with each other as clamp 10 moves to the relaxed state. If surface 15 is at an angle to axis 8, as illustrated in FIG. 1C, any reduction in the diameter of clamp 10 will increase the space between the overlapping clamp and cylinder, greatly reducing the friction between these members.

It should be apparent that there are many modifications possible with this invention. For example, many other forms of spreader are contemplated, such as a wedge that is placed between the ends 24, 26 and either destroyed or removed to cause the clamp to go the relaxed position. In addition, the linear shaped charge leg cutter could be replaced by explosively or otherwise-actuated cutters that mechanically sever the spreader legs from the spreader body. It is intended that the scope of the invention be defined by the appended claims.

What is claimed is:

1. A method for controllably clamping an end of one hollow member to an end of a second hollow member, the members having substantially identical interior surfaces at each end, each interior surface including a clamping surface extending from the interior surface, the method comprising:

placing, at the ends of said members, a split ring having an outside diameter and two ends, and a closed state where the ends of said ring are adjacent and the outside diameter of said split ring is less than a minimum inside diameter of said members at their ends, the split ring having a V-shaped rim with two spaced projecting surfaces, wherein the split ring is relaxed in the closed state and is elastically deformed when the ends of the ring are separated;

separating the ends of the split ring until the rim engages the inside of said hollow members with one spaced projecting surface in contact with the clamping surface of one member and the other spaced projecting surface in contact with the clamping surface of the other member;

providing a spreader to keep the ends of the ring separated; and, controllably destroying the spreader, thereby permitting the ring to return to the closed state so the members are no longer clamped together.

2. The method of claim 1 further comprising explosively destroying the spreader.

3. The method of claim 2 wherein said step of explosively destroying the spreader comprises detonating a linear shaped charge adjacent the spreader.

4. The method of claim 3 wherein the spreader has a pair of parallel spaced legs that engage holes in each end of the ring, and the step of explosively destroying the spreader further comprises severing each leg with a linear shaped charge adjacent the leg.

5. The method of claim 1 further comprising mechanically destroying the spreader.

6. The method of claim 5 wherein the spreader has a pair of parallel spaced legs that engage holes in each end of the ring, and the step of mechanically destroying the spreader further comprises severing each leg with an explosively actuated bolt cutter adjacent the leg.

7. An internal V-clamp for holding two hollow members having abutted ends, the members having substantially identical inside dimensions, and each member having a clamping surface extending from an interior surface adjacent each abutted end, said clamp comprising:

a split ring having an outside diameter and two ends and a relaxed closed state where the ends of said ring are adjacent and the outside diameter of said split ring is less than a minimum inside diameter of said members at their abutted ends, said split ring having a V-shaped rim with two spaced projecting surfaces, and each of the two ends of said split ring having a hole, the holes in the two ends being parallel;

a spreader for holding said split ring in an elastically stretched position such that said ring rim is pressed tightly against the interior surfaces of said members with one projecting surface being in contact with the clamping surface of one member and the other projecting surface being in contact with the clamping surface of the other member, the spreader comprising, a spreader body:

a pair of parallel legs sized to fit in the holes in the ends of the split ring and extending from said spreader body, said legs being spaced apart a distance equal to the distance between the holes in the ends of the split ring when said ring is in the stretched position; and, each leg further comprises a set screw in a transverse hole through the leg, wherein said set screw may be tightened against the ring to increase the force of the ring against the clamping surfaces.

8. An internal V-clamp for holding two hollow members having abutted ends, the members having substantially identical inside dimensions, and each member having a clamping surface extending from an interior surface adjacent each abutted end, said clamp comprising:
- a split ring having an outside diameter and two ends and a relaxed closed state where the ends of said ring are adjacent and the outside diameter of said split ring is less than a minimum inside diameter of said members at their abutted ends, said split ring having a V-shaped rim with two spaced projecting surfaces, and each of the two ends of said split ring having a hole, the holes in the two ends being parallel;
- a spreader for holding said split ring in an elastically stretched position such that said ring rim is pressed tightly against the interior surfaces of said members with one projecting surface being in contact with the clamping surface of one member and the other projecting surface being in contact with the clamping surface of the other member, the spreader comprising,
    - a spreader body;
    - a pair of parallel legs sized to fit in the holes in the ends of the split ring and extending from said spreader body, said legs being spaced apart a distance equal to the distance between the holes in the ends of the split ring when said ring is in the stretched position; and,
- a controllable leg-cutter for cutting each leg of the spreader.

9. The internal V-clamp of claim 8 wherein said leg-cutter comprises a linear shaped charge extending across said leg at a location between said ring and said spreader body.

10. The internal V-clamp of claim 9 further comprising a slit through a portion of said leg adjacent said linear-shaped charge, said slit being in compression when said spreader is engaged with said ring.

11. The internal V-clamp of claim 8 wherein said leg-cutter is affixed to one of said members.

12. The internal V-clamp of claim 8 wherein said clamping surface is on a flange of said hollow member.

13. The internal V-clamp of claim 8 wherein said clamping surface is on a groove in said interior surface of said hollow member.

14. The internal V-clamp of claim 8 further comprising a shoulder affixed to one of said members, said shoulder being parallel to and spaced from an inside surface of said ring, said shoulder keeping said ring centered in the members after said ring is in its relaxed state.

15. A method for controllably clamping an end of one hollow member to an end of a second hollow member, the members having substantially identical interior surfaces at each end, each interior surface including a clamping surface extending from the interior surface, the method comprising:
- placing, at the ends of said members, a split ring having an outside diameter and two ends, and a closed state where the ends of said ring are adjacent and the outside diameter of said split ring is less than a minimum inside diameter of said members at their ends, the split ring having a V-shaped rim with two spaced projecting surfaces, wherein the split ring is relaxed in the closed state and is elastically deformed when the ends of the ring are separated;
- separating the ends of the split ring until the rim engages the inside of said hollow members with one spaced projecting surface in contact with the clamping surface of one member and the other spaced projecting surface in contact with the clamping surface of the other member;
- providing a spreader to keep the ends of the split ring separated, the spreader comprising one or more selected from the group consisting of an explosively removable spreader, an explosively severed spreader, an explosively destroyed spreader, a mechanically severed spreader, and a mechanically destroyed spreader.

* * * * *